United States Patent [19]

Mihm, Jr.

[11] Patent Number: 5,452,290
[45] Date of Patent: Sep. 19, 1995

[54] LOOK AHEAD CHANNEL SWITCHING TRANSCEIVER

[75] Inventor: Thomas J. Mihm, Jr., Mesa, Ariz.

[73] Assignee: Motorola, Inc., Schaumburg, Ill.

[21] Appl. No.: 452,290

[22] Filed: Oct. 26, 1992

[51] Int. Cl.⁶ .............................................. H04J 4/00
[52] U.S. Cl. ..................................... 370/50; 370/95.1
[58] Field of Search .................... 370/95.1, 95.2, 95.3, 370/80, 81, 57, 50; 455/78, 34.1, 33.2, 156.1, 183.1, 76; 328/14

[56] References Cited

U.S. PATENT DOCUMENTS

| | | |
|---|---|---|
| 4,144,412 | 3/1979 | Ito et al. . |
| 4,722,083 | 1/1988 | Tirro et al. . |
| 4,742,512 | 5/1988 | Akaishi et al. ...................... 370/104 |
| 4,783,779 | 11/1988 | Takahata et al. . |
| 4,785,450 | 11/1988 | Bulgiuno et al. .................. 370/95.1 |
| 4,819,227 | 4/1989 | Rosen . |
| 4,870,408 | 9/1989 | Zdunek et al. . |
| 4,955,082 | 9/1990 | Hattori et al. ...................... 370/95.1 |
| 4,965,798 | 10/1990 | Mostafa et al. ..................... 370/95.1 |
| 5,103,445 | 4/1992 | Ostlund .............................. 370/95.2 |
| 5,134,615 | 7/1992 | Freeburg et al. ................... 370/95.3 |
| 5,197,125 | 3/1993 | Engel et al. ......................... 370/95.3 |
| 5,241,542 | 8/1993 | Natarajan et al. .................. 370/95.3 |

FOREIGN PATENT DOCUMENTS 334729A  2/1991  Japan .

OTHER PUBLICATIONS

An article entitled "A Comparison of Measured and Calculated Speech Temporal Parameters Relevent to Speech Activity Detection" by John G. Gruber, from IEEE Transactions on Communications, vol. Com-30, No. 4, Apr. 1982, pp. 728–738.

Primary Examiner—Douglas W. Olms
Assistant Examiner—Ajit Patel
Attorney, Agent, or Firm—Gregory J. Gorrie; Robert M. Handy

[57] ABSTRACT

A transceiver receives channel control commands which communicate predictions of upcoming frequency bands that might be used for communication or which communicate activations of upcoming frequency bands and time units which will be used for communication. The transceiver includes a plurality of synthesizers which can be switched to control the frequencies at which a receiver and transmitter operate. When predictions are received, frequency IDs associated therewith are used in programming new frequencies into non-activated ones of the synthesizers. When each activation is received, a memory structure is programmed to identify one of the synthesizers, to record a frequency for programming into the identified synthesizer, and to record timing data describing when to program the identified synthesizer and when to activate the identified synthesizer. The memory structure is used to control the programming and switching of synthesizers which drive the receiver and the transmitter.

22 Claims, 6 Drawing Sheets

LOOK AHEAD CHANNEL SWITCHING TRANSCEIVER

TECHNICAL FIELD OF THE INVENTION

The present invention relates generally to communication systems. More specifically, the present invention relates to communication system transceivers which operate over any number of discrete channels.

BACKGROUND OF THE INVENTION

As a general rule, a communication system strives to conserve the overall bandwidth that is available to it. As a given bandwidth is used more efficiently, a greater quantity of information may be communicated using given communication resources.

Real time human speech represents one type of information that is often delivered through a communication system. Human speech contains a large quantity of silent periods. To a large extent, for a conversation to be successful one party to the conversation must be silent when another party to the conversation is talking. Moreover, even when one party is talking, the talking party's speech is permeated with small periods of silence. Accordingly, a technique known as digital speech interpolation (DSI) may be used to efficiently utilize a bandwidth that is available for the transmission of many independent conversations. Generally speaking, DSI divides speech from many conversations into frames of relatively short time spans. On a frame-by-frame basis, the available resources are allocated to only those conversations which are not silent. As a general rule, up to a 50% improvement in overall bandwidth utilization results from not transmitting the silent periods in human speech.

On the other hand, a transceiver which operates within a DSI scheme must be extremely agile in its ability to switch between various channels that are available within the overall communication system bandwidth. A previously used channel becomes unavailable to a given conversation after a silent period because the communication system assigns the previously used channel to another conversation at the instant silence begins. The communication system identifies and assigns available channels at the instant silence ends. In order to prevent the loss of information, a transceiver needs to quickly switch to a newly assigned channel.

Data generated by and communicated between computerized devices represent another type of information that is often delivered through communication systems. These data often need not be delivered in real time. In other words, the data may be transmitted at any rate consistent with the available system bandwidth. Communication systems often force such data to be transmitted through a constant bandwidth channel which might otherwise be suitable for real time data. This represents an inefficient use of an overall communication system bandwidth which has a multiplicity of channels. Channels often go unused on an instant-by-instant basis when the communication system is operating at less than its maximum capacity. Any period of time over which a channel remains unused represents an inefficiency which could be improved upon. Data which need not be delivered through a constant bandwidth channel could be transmitted over otherwise temporarily unused channels. Overall bandwidth usage efficiency would improve due to increased data transmission rates.

However, a transceiver which is compatible with a variable bandwidth data transmission scheme would need to quickly switch to newly assigned channels on an instant-by-instant basis as such channels become available.

When communication systems employ frequency division multiple access (FDMA) transmission schemes, transceivers operating in accordance with DSI and/or variable bandwidth transmission techniques would need to quickly switch their operation between different frequency channels. In these situations, a transceiver needs to modify its operation and be capable of communicating through a new frequency channel within a period of time equivalent to an inter-frame or inter-timeslot timing gap to prevent the loss of information. In most communication schemes, such timing gaps are as short as possible, often on the order of a few tens of microseconds, because no communication can occur during these gaps and shorter gaps improve overall efficiency.

Unfortunately, frequency synthesizers which are capable of quickly and accurately slewing to and/or locking onto new frequencies over a range of many different frequency channels are extremely expensive. Such synthesizers may be constructed substantially from discrete components or from integrated circuits which undergo an unusually high level of processing and testing. Either way, such synthesizers may cost many times what synthesizers having a more moderate frequency locking rate cost.

Moreover, transceivers which include such high frequency locking rate synthesizers often suffer from reduced reliability. Locking rate becomes a critical parameter for successful transceiver operation. The locking rate describes the amount of time required for a synthesizer to slew its frequency output from an old frequency to a new frequency and become locked at the new frequency. Any deterioration over time in this locking rate parameter can directly and adversely affect transceiver operation.

SUMMARY OF THE INVENTION

Accordingly, it is an advantage of the present invention that an improved transceiver and an improved method of operating a transceiver are provided.

Another advantage is that the present invention provides a variable bandwidth transceiver.

Another advantage of the present invention is that a transceiver is provided which is capable of quickly tuning to new frequencies.

Another advantage is that the present invention quickly communicates at new and different frequencies without the use of expensive synthesizers.

Another advantage is that the present invention has improved reliability because synthesizer locking rate is not a critical parameter.

The above and other advantages of the present invention are carried out in one form by an improved method of communicating data using a variable bandwidth communication channel. The method calls for receiving, in a receive time unit, a channel control command. The channel control command identifies a plurality of time units available for use in communicating the data. Portions of the data are then communicated during the identified time units.

The above and other advantages of the present invention are carried out in another form by an improved method of controlling a transceiver that has first and second synthesizers. The method permits rapid switching between channels, and the method calls for receiving a channel control command. The first synthesizer is programmed to generate a first oscillation signal having a frequency which is responsive to the channel control command. After programming the first synthesizer, communications are conducted over a channel which is defined by a second oscillation signal that is generated by the second synthesizer. A switching event is recognized, and after the switching event communications are conducted over a channel that is defined by the first oscillation signal.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
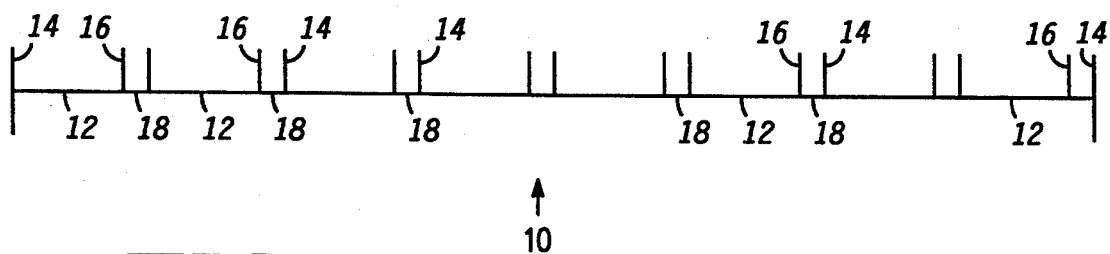
FIG. 1 shows an exemplary communication framing format utilized in accordance with a communication system within which a transceiver operates.

FIG. 1 shows an exemplary time division multiple access (TDMA) communication framing format 10 utilized in transporting communications through a communications network (not shown). TDMA format 10 includes any number of sequential time units 12, each of which has a beginning 14 and an end 16. Time units 12 may be viewed as sets of frames, frames, sets of time slots, time slots, or the like. Between an end 16 of one time unit 12 and a beginning 14 of the next time unit 12, format 10 may insert a inter-unit time gap 18. FIG. 1 exaggerates the duration of gap 18 for clarity of illustration. In practice, gap 18 may be very brief, such as on the order of a few microseconds or less. As is conventional in TDMA communication framing formats, gap 18 allows communication devices (not shown) to distinguish one time unit 12 from another time unit 12 and to prevent interference between diverse communications occurring in different time units 12.

Figure 2:
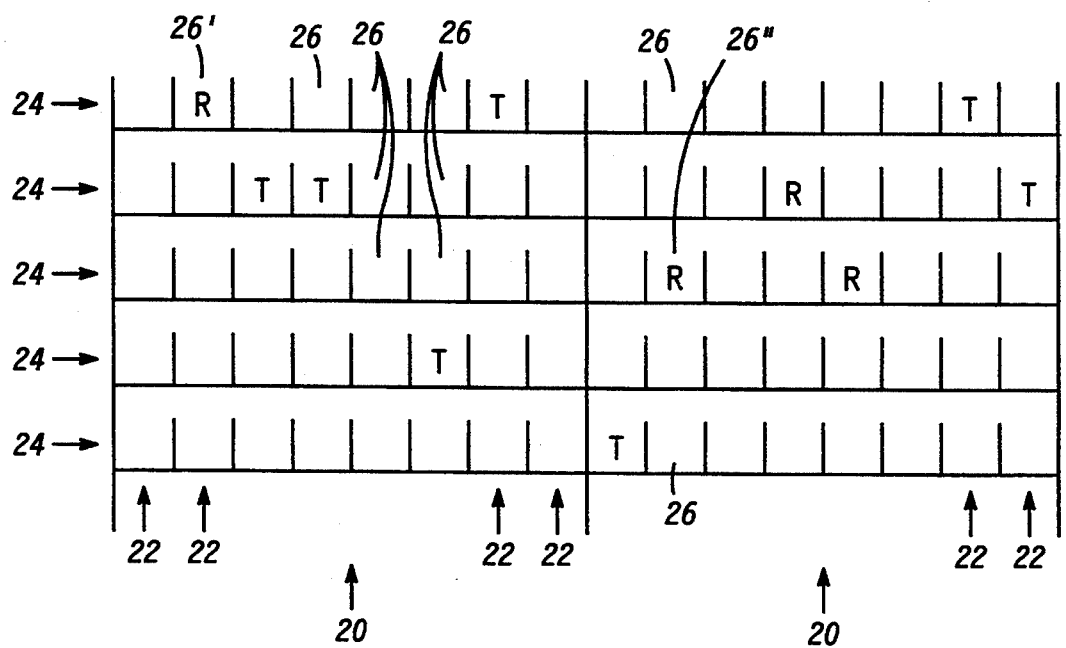
FIG. 2 shows an exemplary FDMA/TDMA communication scheme utilized by the transceiver and communication system.

FIG. 2 shows an exemplary FDMA/TDMA communication scheme with which one preferred embodiment of the present invention may operate. As shown in the horizontal dimension of FIG. 2, communications may be divided into sequential frames 20. FIG. 2 shows only two frames 20, but those skilled in the art will appreciate that a communication scheme may use a continuous stream of frames 20. Each frame 20 may be divided into any number of time slots 22. Any frame 20 or time slot 22 can serve as a time unit 12 (see FIG. 1). In the example presented in FIG. 2, eight of time slots 22 are included per frame 20, but this number is irrelevant to the present invention. Gaps 18 (see FIG. 1) are omitted in FIG. 2 for clarity.

As shown in the vertical dimension of FIG. 2, communications may be further divided into numerous discrete frequency bands 24. FIG. 2 illustrates only 5 different frequency bands for clarity of illustration. However, in accordance with the preferred embodiments, up to two hundred or more discrete frequency bands are contemplated. The precise number of discrete frequency bands is irrelevant to the present invention.

In the communication scheme illustrated in FIG. 2, a constant bandwidth channel is defined by identifying a particular time slot 22 and frequency band 24. A constant bandwidth communication channel results from utilizing the identified time slot 22 and frequency band 24 from frame 20 to frame 20 to transport communications. For purposes of the present invention, a channel segment 26 is defined to be the portion of a constant bandwidth channel which resides within a single frame 20. In other words, channel segment 26 represents a portion of the spectrum defined by a single frequency band 24 during one time slot 22 from only one frame 20.

Thus, FIG. 2 illustrates an overall bandwidth, or spectrum, divided into forty independent channels (eight time slots at five frequency bands). The preferred embodiment may actually contemplate 2,000 to 5,000 independent channels, but FIG. 2 refrains from showing this number of independent channels for clarity of illustration. Each frame 20 in the FIG. 2 example contains forty channel segments 26. While nothing prevents certain ones of time slots 22 or frequency bands 24 from being allocated exclusively to transmitting or receiving activities, such exclusive allocations are not required by the present invention. Moreover, nothing requires all time slots 22 to be of the same duration or all frequency bands 24 to have the equivalent frequency ranges.

FIG. 2 further illustrates a variable bandwidth communication channel. The letter "R" denotes channel segments 26 which have been allocated to a transceiver (discussed below) for receiving a communication. The receiving activity is defined from the perspective of the transceiver. The letter "T" denotes channel segments 26 which have been allocated to the transceiver for transmitting a communication. The transmitting activity is defined from the perspective of the transceiver. A communication network controller may allocate channel segments 26 on a frame-by-frame basis to any number of transceivers in a manner which most efficiently utilizes the overall bandwidth and/or meets the requirements of real time communication. Allocation of bandwidth is well known in connection with digital speech interpolation (DSI) and in connection with the operation of cellular networks. Accordingly, such allocation techniques need not be discussed further herein.

The allocation of upcoming channel segments 26 is communicated to the transceiver during a receive (R)

time unit, such as for example, channel segment 26'. Preferably, no two allocated channel segments 26 have the same time slot 22. Except for this limitation, the allocation may assign any number of channel segments 26 to the transceiver for any upcoming duration. The assignment of channel segments 26 may be for the purposes of transmitting, of receiving, or both. This upcoming duration may, but need not, be confined to frame 20 boundaries. In the example depicted in FIG. 2, at segment 26' the transceiver receives an assignment of the first five transmit (T) channel segments 26 and the first receive (R) channel segment 26" which follow channel segment 26'. The transmitter may then transmit data during the assigned transmit (T) channel segments 26 and receive data during the assigned receive (R) channel segment 26". In receive channel segment 26", the transmitter may, but need not, receive an additional assignment of channel segments 26. As shown in FIG. 2, the subsequent allocation of channel segments may vary the number of channel segments 26 assigned to the transceiver. Accordingly, the bandwidth available to the transceiver varies from allocation to allocation.

As illustrated in FIG. 2, the variable bandwidth communication channel may on occasion require the transceiver to operate at one frequency until the end of one time slot 22, then operate at another frequency at the beginning of the next time slot 22. Such immediately sequential allocations require the transceiver to change its frequency of operation rapidly.

Figure 3:
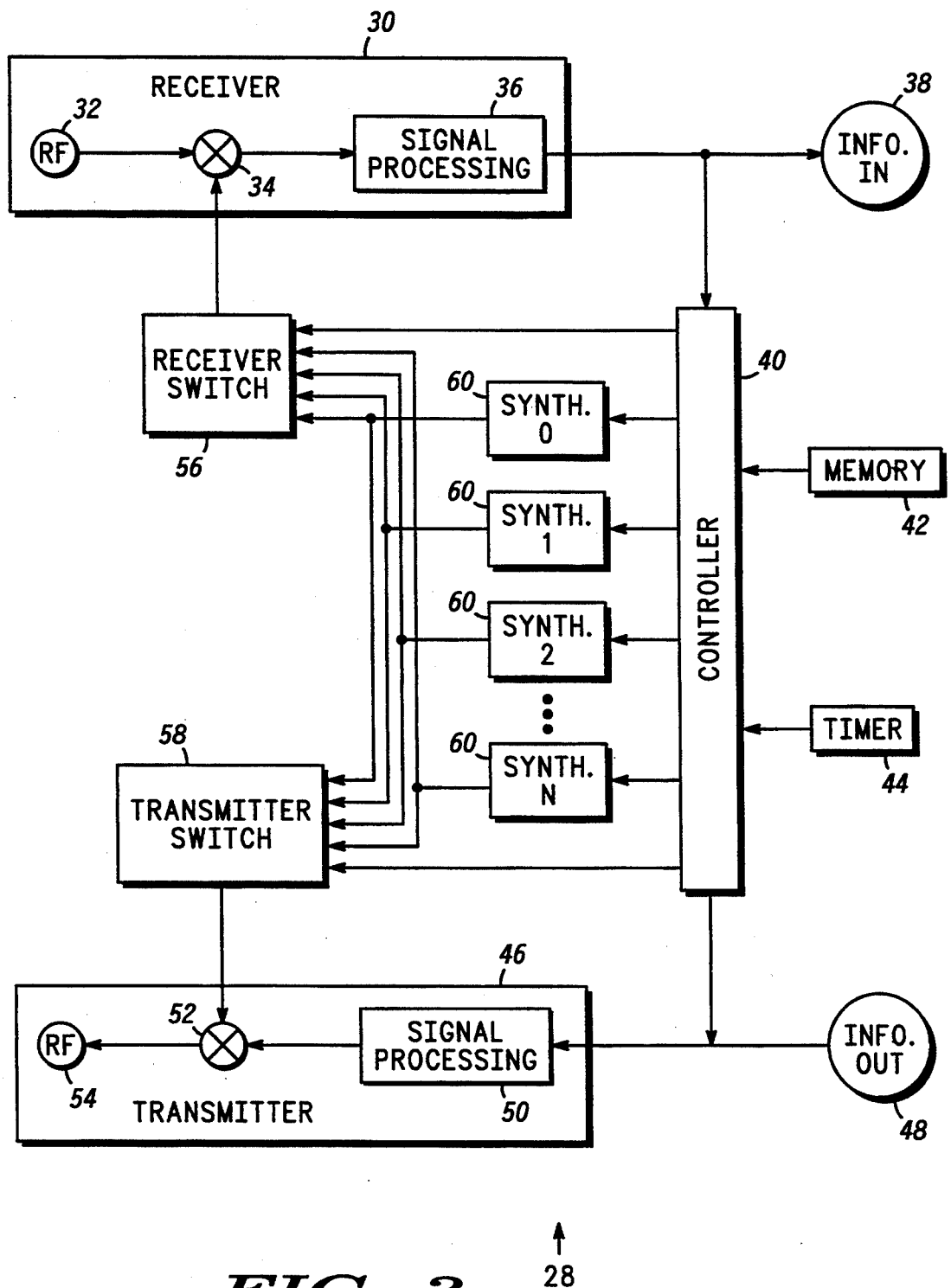
FIG. 3 shows a block diagram of a transceiver which communicates in accordance with the framing format of FIG. 1 and with the FDMA/TDMA scheme of FIG. 2.

FIG. 3 shows a block diagram of a transceiver 28 which is capable of operating in accordance with the variable bandwidth communication channel illustrated in FIG. 2 and with other communication schemes, such as DSI. As shown in FIG. 3, transceiver 28 includes a receiver 30 which includes an RF input 32 that feeds an input of a mixer 34. An output of mixer 34 feeds a signal processing section 36. Signal processing section 36 includes filters, amplifiers, analog-to-digital converters, decoders, error correcting circuits, and buffers (not shown) to the extent required by the application and in accordance with conventional techniques. A baseband output of signal processing section 36 serves as an output from receiver 30. This baseband output drives information input circuits 38 and a data input of a controller 40. Information input circuits 38 process the received data in accordance with a specific application. For example, digitized voice may be reconstructed and presented at a speaker (not shown), digitized video may be reconstructed and presented at a display (not shown), and/or the data may be routed to a computerized device, such as a personal computer, printer, storage device, facsimile machine, or the like.

Controller 40 controls the frequency and timing parameters upon which transceiver 28 operates. Controller 40 may be implemented using one or more conventional microprocessors. Controller 40 additionally couples to a memory 42 and a timer 44. Memory 42 records data which serve as instructions to controller 40 and which, when executed by controller 40, cause transceiver 28 to carry out procedures that are discussed below. In addition, memory 42 includes variables, tables, memory structures, and databases that are manipulated due to the operation of transceiver 28. Controller 40 uses timer 44 in identifying the beginnings 14 and ends 16 of time units 12 (see FIG. 1).

One data output of controller 40 couples to a baseband input of a transmitter 46. In addition, information output circuits 48 provide a data output which drives the baseband input of transmitter 46. In particular, the baseband input of transmitter 46 is provided by a signal processing section 50 that includes conventional buffering, encoding, digital-to-analog, and other circuits as needed by the application. Signal processing section 50 has an output that couples to an input of a mixer 52, and an output of a mixer 52 couples to an RF output 54.

Other data outputs of controller 40 couple to a control input of a receiver switch 56, a control input of a transmitter switch 58, and control inputs of any number of frequency synthesizers 60. Synthesizers 60 preferably exhibit only a moderate or low rate for locking onto changes in frequency. In other words, the length of time required for any one of synthesizers 60 to generate an oscillation signal having a frequency programmed therein by controller 40 need not be particularly short and need not be less than the duration of gap 18 or even of a single time unit 12 (see FIG. 1). For this reason, synthesizers 60 may be inexpensively and reliably constructed using well known mass market integrated circuit manufacturing techniques.

Oscillator outputs from each of synthesizers 60 couple to corresponding input ports of receiver switch 56 and of transmitter switch 58. In other words, in the embodiment depicted in FIG. 3, each synthesizer drives its own input port of receiver switch 56 and its own input port of transmitter switch 58. In an alternate embodiment which is not depicted in FIG. 3, various ones of synthesizers 60 may be dedicated to driving only receiver 30 while other ones of synthesizers 60 may be dedicated to driving only transmitter 46. This alternate embodiment may be desirable when transmission and reception occur at widely differing frequencies.

An output port of receiver switch 56 drives an oscillator input of receiver 30. In particular, an input of mixer 34 serves as this oscillator input. An output port of transmitter switch 58 drives an oscillator input of transmitter 46. In particular, an input of mixer 52 serves as this oscillator input.

Generally speaking, any one of synthesizers 60 may provide an oscillation signal whose frequency defines a frequency band 24 (see FIG. 2) at which communications are received at transceiver 28 or a frequency band 24 at which communications are transmitted from transceiver 28. Controller 40 monitors the baseband output data from receiver 30 to detect the presence of channel control commands. These channel control commands instruct controller 40 of frequencies to use in programming synthesizers 60. These programming commands are received before the points in time when the frequencies are needed for receiving or transmitting communications.

These channel control commands also define switching events. Controller 40 identifies the specified switching events and controls switches 56 and 58 so that a synthesizer 60 which has previously been programmed to oscillate at a specified frequency and which has had sufficient time to lock its output at this frequency can instantly drive the specified receiver 30 and/or transmitter 46.

In some applications, such as the variable bandwidth communication channel discussed above in connection with FIG. 2, channel segments 26 may be assigned and communicated to transceiver 28 well in advance of the time units 12 (see FIG. 1) within which the assignments become active.

In other applications, such as DSI, frequency band predictions may be communicated to transceiver 28 in advance of an actual frequency band assignment. Preferably, the frequency bands predicted are the ones that a DSI controller (not shown) deems most likely to become available soon. Those skilled in the art of DSI are familiar with techniques for calculating statistical probabilities for silence and talkspurt durations. The present invention contemplates the use of such statistical calculations by a DSI controller in identifying channels which are most likely to soon become silent. A majority of the time, an actual assignment of a channel simply represents an activation of a channel which was previously predicted to become silent soon. This actual assignment or activation may be implemented instantly upon detection of the activation command because a synthesizer has been previously programmed to this frequency and has had sufficient time to lock on to the programmed frequency.

As discussed above, controller 40 monitors data from the baseband output of receiver 30. When controller 40 detects a channel control command, controller 40 then performs a Channel Control Command procedure, which is discussed below in connection with FIG. 6.

Figure 4:
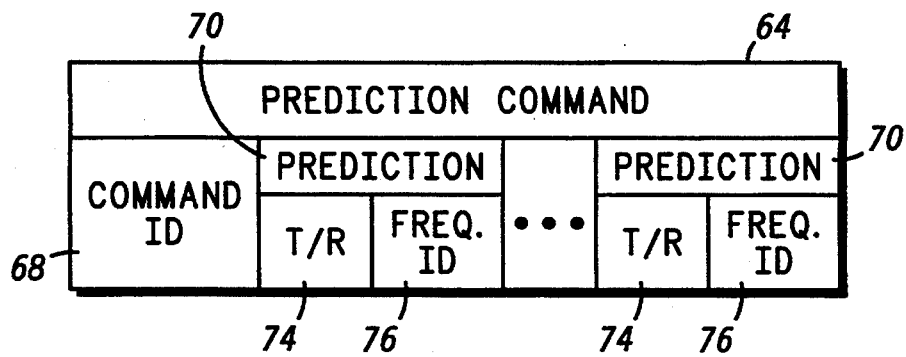
FIG. 4 shows a block diagram of an exemplary prediction command receivable by the transceiver.
Figure 5:
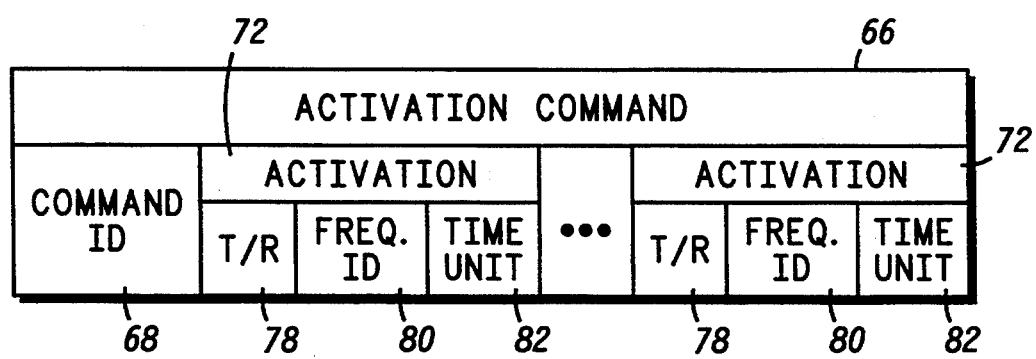
FIG. 5 shows a block diagram of an exemplary activation command receivable by the transceiver.

The present invention contemplates the use of at least two different types of channel control commands. FIG. 4 shows a block diagram of an exemplary prediction command 64, and FIG. 5 shows a block diagram of an exemplary activation command 66. Prediction commands 64 are received primarily to communicate a predicted frequency which may or may not be activated in the future. No timing information is associated with a prediction command, and the predictions conveyed thereby will not be acted upon by transceiver 28 in operating receiver 30 or transmitter 46 (see FIG. 3) until a later occurring switching event is detected by transceiver 28. Activation commands 66 are received primarily to communicate an instruction to activate a new frequency for the operation of receiver 30 or transmitter 46. Activation commands 66 convey timing data which is used in instructing transceiver 28 when the activation shall take place. An activation command may instruct an instant activation and thereby represent the switching event which leads to the activation of a previously predicted frequency. Alternatively, an activation command may be used to assign channel segments 26 (see FIG. 2) well in advance of their actual activation.

With reference to FIGS. 4-5, each of channel control commands 64 and 66 includes a command ID code 68 which controller 40 (see FIG. 3) uses to determine that the command is a channel control command. Command ID 68 in a prediction command 64 identifies the command as a prediction command 64, and command ID 68 in an activation command 66 identifies the command as an activation command. In the preferred embodiment, prediction commands 64 may carry any number of predictions 70 and activation commands 66 may carry any number of activations 72. Each prediction 70 includes an optional "T/R" code 74 which identifies the prediction as applying to transmitter 46 or receiver 30 (see FIG. 3). T/R code 74 is required only if various ones of synthesizers 60 are dedicated to driving only receiver 30 while other ones of synthesizers 60 are dedicated to driving transmitter 46. Each prediction 70 also includes a frequency ID code 76 which identifies a predicted frequency. Each activation 72 includes T/R code 78 and frequency ID code 80. T/R code 78 identifies whether a frequency is being activated for transmitter 46 or receiver 30. Frequency ID code 80 identifies a frequency being activated. In addition, each activation 72 includes a time unit code 82 which identifies a point in time at which the identified frequency shall become active.

Of course, those skilled in the art will appreciate that many variations from the structure illustrated in FIGS. 4-5 may be used in communicating the information carried by channel control commands 64 and 66. For example, a channel control command may span multiple transmissions, time slots, or the like to communicate multiple predictions or activations. Likewise, a channel control command may be devised which uses a common command ID 68 for both prediction and activation commands but includes another field that distinguishes activation from prediction commands.

Figure 6:
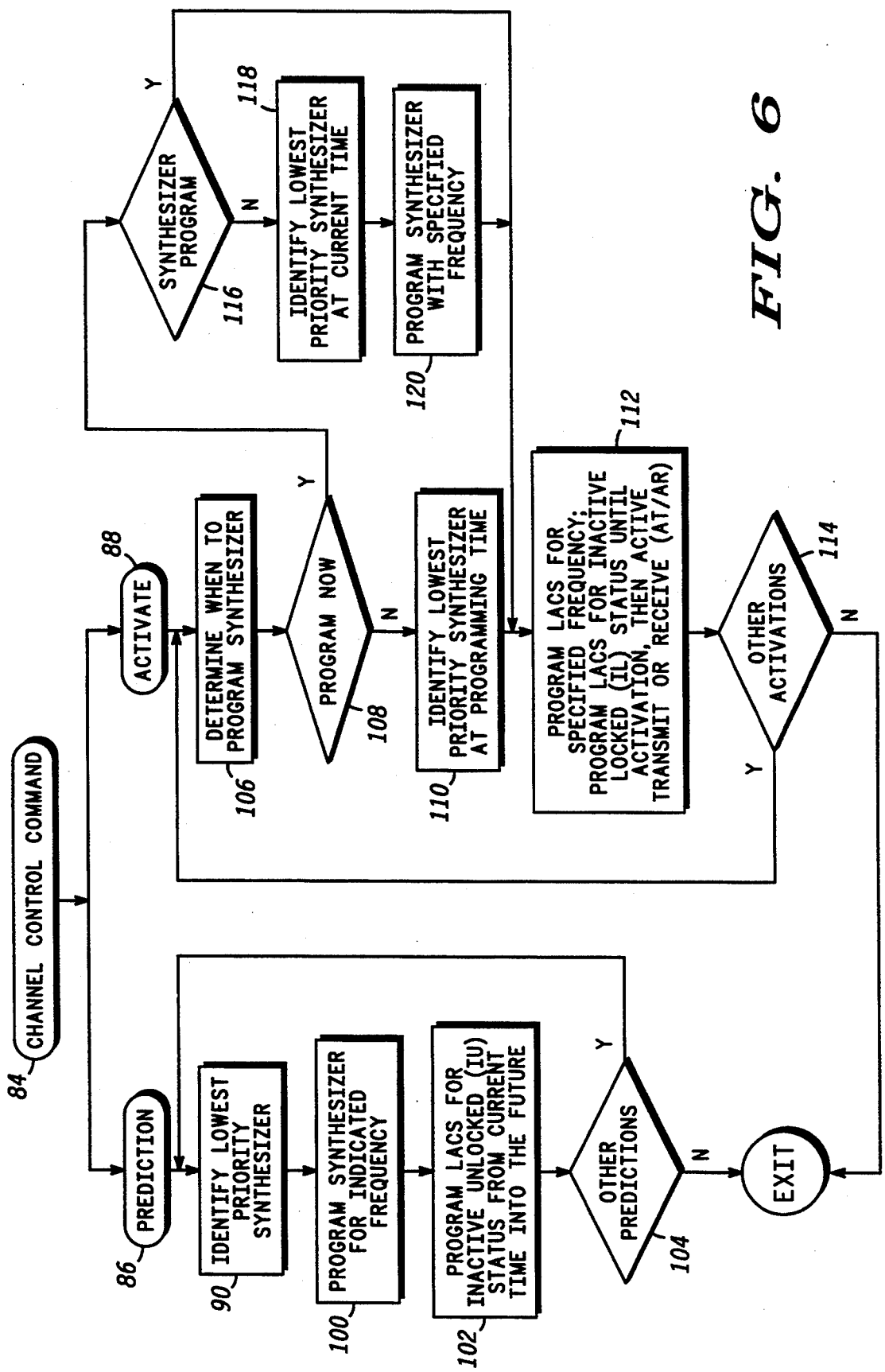
FIG. 6 shows an exemplary flow chart of a Channel Control Command procedure performed by the transceiver.

FIG. 6 shows an exemplary flow chart of a Channel Control Command procedure 84 performed by transceiver 28 and primarily by controller 40 thereof. Transceiver 28 performs procedure 84 whenever a channel control command 64 or 66 (see FIGS. 4-5) is detected. In particular, procedure 84 performs prediction process 86 when a prediction command 64 is detected and an activation process 88 when an activation command 66 is detected.

Prediction process 86 performs a task 90 when a prediction command 64 is received. Task 90 identifies the one of synthesizers 60 (see FIG. 3) which currently has the lowest priority. In determining priorities, task 90 may refer to a look ahead control structure (LACS) 92, an exemplary block diagram of which is depicted in FIG. 7.

LACS 92 is a memory structure maintained by controller 40 in memory 42 (see FIG. 3). With reference to FIG. 7, LACS 92 is partitioned into three dimensions. Each of "M"+1 synthesizers 60 included in transceiver 28 is described in a synthesizer dimension 94. A time dimension 96 describes each of "N"+1 time units 12 (see FIG. 1) over which controller 40 may "look ahead" from the current time. The variable N+1 may, but is not required to, be equivalent to the number of time slots 22 included in a frame 20 (see FIG. 2). A parameter dimension 98 of LACS 92 records frequency and status information. Thus, LACS 92 records a frequency and status for each of M+1 synthesizers included in transceiver 28 and for each of N+1 time units into the future, counting a current time unit.

Figures 7, 8:
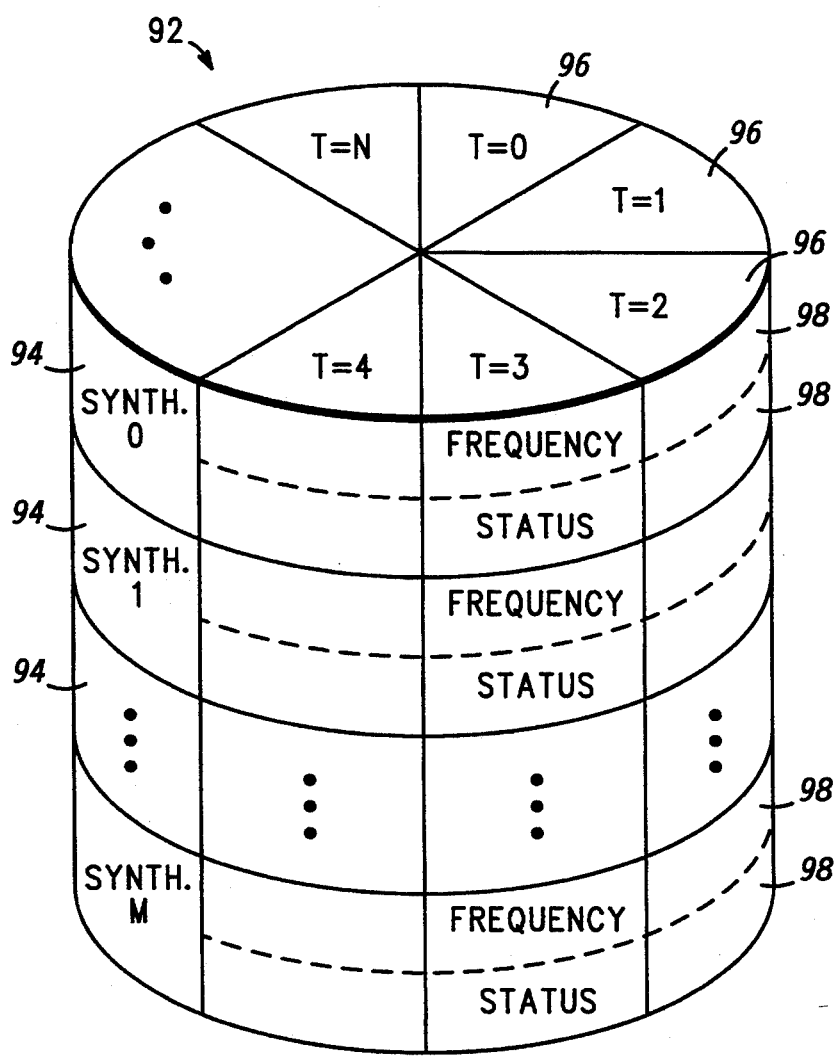
FIG. 7 shows an exemplary block diagram of a look ahead control structure (LACS) maintained in a memory of the transceiver.
FIG. 8 shows a table of exemplary status codes utilized in connection with the LACS.

FIG. 8 shows an exemplary table of various status codes contemplated by the present invention for use in LACS 92 to indicate the status of various synthesizers 60 at various current and future time units 12. As shown in FIG. 8, active receiver (AR) and active transmitter (AT) status codes are associated with the highest priority. Active status codes are associated with synthesizers 60 which are being used to drive receiver 30 or transmitter 46 at the indicated time units 12. Synthesizers 60 that have an active status code should not be reprogrammed to a new frequency because such reprogramming would interfere with current communications.

An inactive locked (IL) status is slightly lower in priority than the active status codes. The IL status code describes synthesizers which are not driving either receiver 30 or transmitter 46 but which should not be reprogrammed to a new frequency. Generally, the IL status code is associated with synthesizers 60 which will become active (i.e. will drive either receiver 30 or transmitter 46) at their currently programmed frequency in the near future.

Inactive unlocked (IU) status codes are lower in priority than the inactive locked (IL) status code. Moreover, a priority tag is included with IU status codes so that "N"+1 different inactive unlocked (IU) status codes are described, where N+1 again represents the number of time units 12 over which controller 40 may look ahead from the current time. In the status code scheme depicted by FIG. 8, an IU/N status code has the highest inactive unlocked (IU) priority while the IU/0 status code has the lowest priority for any possible status code. Those skilled in the art will appreciate that numbers may be easily assigned to status codes such that higher numbers correspond to higher priority and lower numbers correspond to lower priority. The IU status codes are associated with synthesizers 60 which may be reprogrammed to a new frequency.

With reference back to FIG. 6, task 90 examines the status codes in LACS 92 (see FIG. 7) for the current time unit 12 (T=0) to identify the synthesizer 60 that LACS 92 describes as having the lowest priority status code. In the above-discussed alternate embodiment where synthesizers 60 are dedicated to either receiver 30 or transmitter 46, task 90 may confine its examination to only transmitter or receiver synthesizers, as indicated by T/R code 74 of a prediction 70 (see FIG. 4). The status codes discussed above in connection with FIG. 8 prevent the active synthesizers 60, which are being used to drive receiver 30 or transmitter 46, from being selected in task 90.

Once the lowest priority synthesizer 60 has been identified, a task 100 programs the indicated synthesizer 60 for the frequency specified by a frequency ID 76 of a particular prediction 70 (see FIG. 4). This programming causes the synthesizer 60 to generate a new frequency even though it may take some time for the synthesizer 60 to lock onto the new frequency.

After task 100, a task 102 programs LACS 92 (see FIG. 7) at the current time unit (T=0) and for the selected lowest priority synthesizer 60 to indicate its new programmed frequency and to indicate an inactive unlocked (IU) status (see FIG. 8). Task 102 extends this frequency and IU status programming in LACS 92 into future time units (T=1 through T=N) for the selected synthesizer 60. Moreover, the above-discussed IU status code priority tag is decremented so that the current time unit receives the IU/N status code while the unit "N"time units into the future receives the IU/0 status code. The decrementing priority tag causes the synthesizer's priority to decrease as time passes without the synthesizer 60 being activated.

After task 102, a query task 104 determines whether additional frequency predictions 70 (see FIG. 4) are being carried by prediction command 64. If additional predictions are being carried by command 64, program control proceeds back to task 90 to process the next frequency prediction 70. When the last prediction has been processed, program control exits procedure 84, but procedure 84 repeats when the next prediction command 64 or activation command 66 is received at transceiver 28.

Accordingly, prediction process 86 processes a frequency prediction field containing any number of frequency predictions. In processing these predictions, the only synthesizers 60 which are actually programmed are the ones which LACS 92 indicates are currently inactive and unlocked. These synthesizers 60 are not currently being used to drive either receiver 30 or transmitter 46. Consequently, the frequency or frequencies at which transceiver 28 is communicating do not change in response to the receipt of predictions. On the other hand, synthesizers 60 which are programmed with new frequencies as a result of the predictions may instantly begin to capture and lock onto the new programmed frequencies.

One of the predicted frequencies may be later activated when transceiver 28 recognizes a switching event. However, nothing requires any of the predicted frequencies to be later activated. For DSI applications, it is anticipated that a prediction command 64 will predict several frequencies, then a subsequent activation command 66 will most likely cause one of the predicted frequencies to become activated. Predictions which do not later become activated will be ignored, and such predictions will be replaced with other predictions by repetitions of Channel Control Command procedure 84 and prediction process 86.

Channel Control Command procedure 84 performs Activation process 88 when transceiver 28 receives an activation command 66 (see FIG. 5). The receipt of an activation command 66 may represent a switching event which transceiver 28 recognizes as an instruction to activate a previously predicted frequency. On the other hand, an activation command 66 may specify a frequency which has not been previously predicted, or command 66 may carry timing data that indicate a switching event will take place at some point in the future.

Upon the receipt of an activation command 66 (see FIG. 5), process 88 performs a task 106 to determine when to program a synthesizer 60 to carry out the instruction indicated by a specific activation 72 (see FIG. 5). This determination may be accomplished by comparing the time unit field 82 (see FIG. 5) of the specific activation 72 with the current time unit (T=0). This comparison may be offset to account for the time required for a synthesizer 60 to lock onto the new frequency. Thus, task 106 determines at which time unit a synthesizer 60 must be programmed so that it may become active to meet the timing constraints imposed by time unit field 82 of activation 72.

After task 106, a query task 108 determines whether a synthesizer 60 must be programmed now to comply with the activation instruction. Process 88 may desirably postpone programming of synthesizers 60 until needed so that opportunities for using synthesizers 60 which occur prior to a specified activation may be preserved. In other words, other activations or predictions may be able to use a synthesizer 60 before it is required for a specific activation. Moreover, the postponing of synthesizer programming until needed permits transceiver 28 to receive and store a number of activations which exceeds the number of synthesizers 60.

When task 108 determines that synthesizer programming may be postponed, a task 110 identifies the lowest priority synthesizer 60 for the time unit at which the synthesizer must be programmed. This determination may be accomplished by examining status codes in LACS 92 (see FIGS. 7-8), as discussed above.

After task 110, a task 112 programs the frequency and status in LACS 92 for the lowest priority synthesizer 60. No actual synthesizer programming or switching occurs at this point. The frequency is programmed in LACS 92 in response to frequency ID 80 (see FIG. 5) of activation 72. The status is set to indicate an inactive locked (IL) status. These frequency and status data are extended through future time units of LACS 92 until the time unit at which the activation will occur is encountered. At the activation time unit, the status, code is set in LACS 92 to indicate either the active transmit (AT) or active receive (AR) status codes (see FIG. 8), as determined by T/R field 78 (see FIG. 5) of activation 72. The recording of active status codes sets an alarm which transceiver 28 will later recognize as a switching event.

In addition, task 112 may set any unlocked status codes for the selected synthesizer 60 which immediately precede the time unit at which the synthesizer must be programmed to a high priority inactive unlocked status code, such as the IU/N code depicted in FIG. 8. This status code will make subsequent iterations of task 110 less likely to identify the selected synthesizer 60 as the lowest priority synthesizer for such preceding time units.

After task 112, a query task 114 determines whether additional activations 72 (see FIG. 5) are being carried by activation command 66 (see FIG. 5). If additional activations are being carried by command 66, program control proceeds back to task 106 to process the next activation 72. When the last activation 72 has been processed, program control exits procedure 84, but procedure 84 repeats when the next prediction command 64 or activation command 66 is received at transceiver 28.

With reference back to task 108 in FIG. 6, task 108 may determine that a synthesizer 60 needs to be programmed now. This determination may result when the determination of task 106 produces a result indicating either the current time unit or a past time unit. The "program now" determination is the normal determination at task 108 for activations in a DSI application. To the extent that a DSI system controller has accurately predicted and communicated the identity of the frequency being activated to transceiver 28, a synthesizer 60 has already locked onto the frequency being activated through the operation of process 86, and the activation may now occur instantly. On the other hand, on occasion a DSI system controller may not have previously predicted the frequency being identified by the activation 72 (see FIG. 5). In this situation, a synthesizer 60 may not be locked onto the frequency identified by the activation 72.

Accordingly, when task 108 determines that a synthesizer 60 needs to be programmed now, a query task 116 is performed to determine if a synthesizer 60 is currently programmed with the frequency ID 80 (see FIG. 5) carried by the activation 72. This determination may be accomplished by examining the frequency parameter of LACS 92 (see FIG. 4) for all synthesizers 60 at the current time unit. If a synthesizer 60 having the indicated frequency is found, which is the normal situation for a DSI application which predicts potential upcoming frequencies, then program control proceeds to task 112, discussed above. The synthesizer which is already programmed to the frequency specified by the activation 72 is selected for further processing in task 112. Task 112 programs LACS 92 to set inactive locked (IL) and active (AR/AT) status codes in accordance with the dictates of the activation 72.

When task 116 determines that no synthesizer 60 is programmed with the frequency ID 86 specified by the activation 72, a task 118 identifies the lowest priority synthesizer 60 at the current time unit. This determination is made by examining status codes in LACS 92 for the current time unit, as discussed above. After task 118, a task 120 programs the selected synthesizer 60 with the frequency specified in the activation 72. After task 120, program control proceeds to task 112, discussed above, to modify LACS 92 to reflect the status and frequency dictated by the activation 72.

Accordingly, activation process 88 processes an activation command 66 (see FIG. 5) to load transceiver 28 with any number of activations 72 (see FIG. 5). Each activation specifies a frequency to be activated and a time unit at which the activation should occur. Process 88 does not actually perform an activation. Rather, process 88 programs LACS 92 to define the synthesizers 60 that need to be programmed, the time units at which they need to be programmed, the frequencies for which the synthesizers 60 need to be programmed, and the time units at which the programmed synthesizers need to be activated. If timing constraints of any activation 72 require a synthesizer 60 to be currently programmed, such current programming is verified. If previous programming cannot be verified then process 88 performs such programming.

Regardless of whether a DSI application is being performed or the above-discussed variable bandwidth transmission channel (see FIG. 2) is being implemented, activation process 88 is used to positively command transceiver 28 to switch to a new frequency or channel segment 26 (see FIG. 2). Transceiver 28 processes this command or instruction so that switching between active channels or channel segments 26 takes place rapidly.

Figure 9:
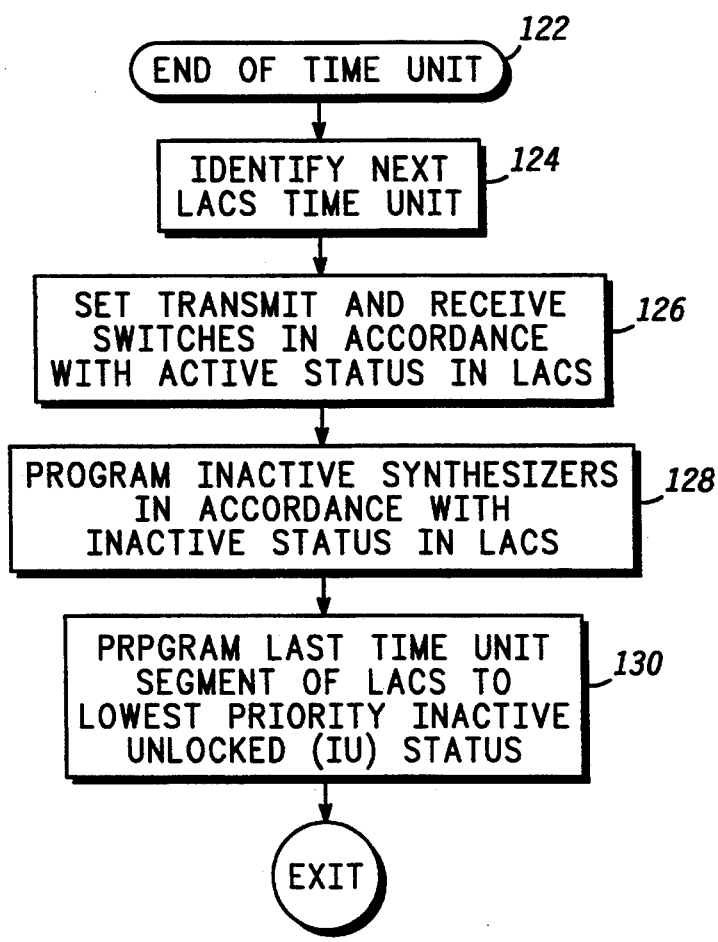
FIG. 9 shows an exemplary flow chart of an End 0f Time Unit procedure performed by the transceiver.

Actual activations occur at the endings 16 of time units 12 (see FIG. 1). FIG. 9 shows a flow chart of an End Of Time Unit procedure 122 that transceiver 28 performs to accomplish an activation. Procedure 122 is performed when transceiver 28 encounters an end 16 of any time unit 12. Procedure 122 performs a task 124 to identify the next time unit in LACS 92 (see FIG. 7). In other words, LACS 92 is effectively rotated counterclockwise with respect to FIG. 7 so that the memory segment that was previously considered time unit $T=1$ (see FIG. 7) will now be considered time unit $T=0$, and time unit $T=0$ will now be considered time unit $T=N$.

After task 124, a task 126 sets receive switch 56 (see FIG. 3) to cause the oscillation output signal from the synthesizer 60 which the new current time unit ($T=0$) in LACS 92 indicates as having an active receive (AR) status to drive receiver 30. Likewise, task 126 sets transmit switch 58 (see FIG. 3) to cause the oscillation output signal from the synthesizer 60 which the new current time unit ($T=0$) in LACS 92 indicates as having an active transmit (AT) status to drive transmitter 46. It is task 126 which actually activates a synthesizer 60 in accordance with an activation 72 (see FIG. 5) that was previously recorded through the performance of activate process 88 (see FIG. 6). A switching event takes place because transceiver 28 recognizes an immediately upcoming time unit as the time unit a previously received activation command 66 (see FIG. 5) specified in connection with an activation 72.

In some situations, LACS 92 may fail to indicate an active status for the current time unit. These situations may occur when no activations 72 (see FIG. 5) directed to the current time unit have been received at transceiver 28. These situations occur commonly, for example, when a constant bandwidth channel has been assigned to the transceiver or when a time unit is encountered for which the transceiver 28 is not permitted to either transmit or receive. In these situations, task 126 simply retains the previously activated synthesizers 60 as active synthesizers and task 126 may modify LACS 92 to reflect this continuation of a previously active synthesizer. Other processes well known to those skilled in the art may be used to disable receiver 30 and/or transmitter 46 during time units when the receiver 30 or transmitter 46 are not permitted to either receive or transmit.

After task 126, a task 128 programs all inactive synthesizers 60, as determined by status codes for the newly current time unit (T=0) in LACS 92 (see FIGS. 7–8) to the frequencies recorded for the current time unit in LACS 92. Of course, nothing prevents task 128 from omitting the programming task in connection with any synthesizers 60 whose frequency is not changing from the previous time unit. Task 128 may program the synthesizer(s) 60 which were active in the previous time unit with a new frequency. The new frequency will have been recorded in LACS 92 as a result of receiving an activation 72 (see FIG. 5) at any time within the previous N+1 time units.

After task 128, a task 130 programs LACS 92 for the previous time unit to indicate the lowest priority inactive, unlocked status (IU/0) for all synthesizers 60. This re-programming of status clears LACS 92 for operation in connection with future repetitions of Channel Control Command procedure 84 (see FIG. 6). After task 130, program control exits procedure 122, but procedure 122 repeats when the next ending 16 to a time unit 12 (see FIG. 1) is encountered.

Figure 10:
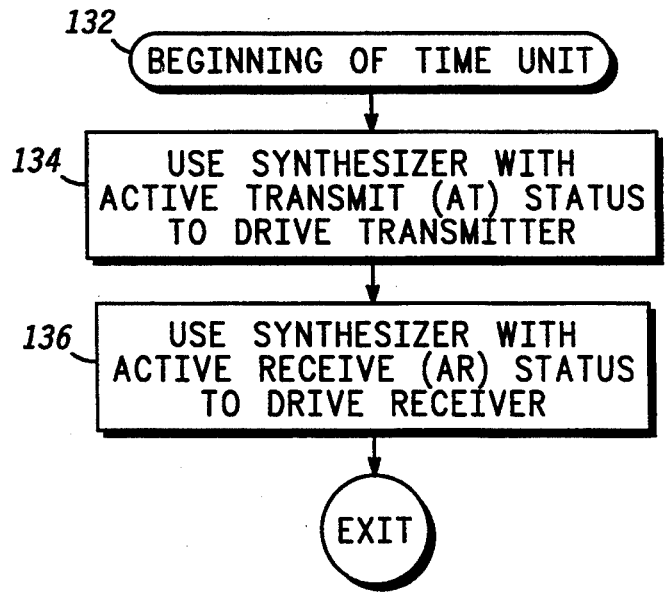
FIG. 10 shows an exemplary flow chart of a Beginning of Time Unit procedure performed by the transceiver.

As illustrated by a flow chart in FIG. 10, when a beginning 14 of a time unit 12 (see FIG. 1) is encountered, a Beginning of Time Unit procedure 132 is performed. As discussed above, the beginning 14 of a time unit 12 may occur a very brief inter-unit time gap 18 (see FIG. 1) following the end 16 of a previous time unit 12. However, within gap 18 procedure 122 (see FIG. 9) has switched the oscillation signals driving receiver 30 and/or transmitter 46 as needed. Thus, a task 134 causes transmitter 46 to be driven by the synthesizer 60 which has an active transmit (AT) status code in LACS 92, and a task 136 causes receiver 30 to be driven by the synthesizer 60 which has an active receive (AR) status code in LACS 92. Tasks 134–136 are continuously performed throughout the upcoming time unit 12 until the next time unit ending 16 (see FIG. 1) is encountered. At that point procedure 122 (see FIG. 9) is repeated, followed by a repetition of procedure 132.

In summary, the present invention provides an improved transceiver and an improved method of operating a transceiver. The present invention provides a variable bandwidth transceiver which can operate in any number of channel segments, and the number of channel segments may vary from frame-to-frame.

The present invention also quickly obtains new transmit and receive frequencies without the use of expensive synthesizers. Rather, the present invention incorporates a plurality of low or moderate performance synthesizers which are typically very inexpensive. This plurality of synthesizers is managed so that they become programmed but not activated in advance of the time units in which they are needed. When a new frequency is needed to drive a transmitter or receiver, a synthesizer has already locked onto the new frequency, and a fast and simple switching operation activates the synthesizer by switching its output to drive the transmitter or receiver. By using a plurality of moderate or low performance synthesizers rather than a high performance synthesizer, cost is reduced because well known mass market integrated circuit manufacturing techniques may be employed without a need for excessive processing or testing. Moreover, by using low or moderate performance synthesizers, reliability is improved because the rate at which a synthesizer locks onto a new frequency becomes an unimportant parameter in the transceiver's design.

The present invention has been described above with reference to preferred embodiments. However, those skilled in the art will recognize that changes and modifications may be made in these preferred embodiments without departing from the scope of the present invention. For example, those skilled in the art will appreciate that the transceiver described herein may perform other procedures which are conventional in nature or unrelated to the present invention. Furthermore, those skilled in the art will readily understand that a wide range in organization and structure of tasks and of memory structures may be employed in constructing the present invention. These and other changes and modifications which are obvious to those skilled in the art are intended to be included within the scope of the present invention.

What is claimed is:

1. A method of communicating data using a variable bandwidth communication channel, said method comprising the steps of:

receiving, from a communication network controller at a transceiver in a receive time unit, a channel control command, said channel control command identifying a plurality of time units available for use in communicating said data;

communicating by said transceiver portions of said data during said identified time units, wherein said channel control command associates a frequency with each of said identified time units, and said transceiver communicates said portions of said data at said frequency associated with each of said identified time units;

programming a first synthesizer to generate a first oscillation signal corresponding to a first frequency associated with each of said time units identified by said channel control command; and programming a second synthesizer to generate a second oscillation signal corresponding to a second frequency associated with each of said time units identified by said channel control command.

2. A method as claimed in claim 1 wherein said method additionally comprises the steps of:

recognizing by said transceiver a first switching event so that, after said first switching event, said communicating step communicates at a frequency which is defined by said first oscillation signal; and recognizing by said transceiver a second switching event so that, after said second switching event, said communicating step communicates at a frequency which is defined by said second oscillation signal, said first and second switching events comprising an instruction to said transceiver to activate a new frequency.

3. A method of controlling a transceiver having a first synthesizer and a second synthesizer, said method permitting rapid switching between channels, and said method comprising the steps of:

receiving a channel control command from a communication network controller at a transceiver;

programming said first synthesizer to generate a first oscillation signal corresponding to a channel having a frequency which is responsive to said channel control command;

communicating, by said transceiver after said programming step, over a channel which is defined by a second oscillation signal generated by said second synthesizer;

recognizing a switching event, said switching event being an instruction to said transceiver to activate the frequency programmed by said first synthesizer; and communicating by said transceiver, after said switching event, over said channel which is defined by said first oscillation signal, wherein said channel control command identifies a plurality of frequencies; and said programming step programs a plurality of synthesizers, including said first synthesizer, to generate a corresponding plurality of oscillation signals, including said first oscillation signal.

4. A method as claimed in claim 3 wherein said recognizing step comprises the step of selecting said first oscillating signal from said plurality of oscillation signals.

5. A method as claimed in claim 3 wherein said recognizing step comprises the step of receiving a second channel control command which identifies said first oscillation signal.

6. A method as claimed in claim 3 wherein:
said channel control command identifies a time unit available for use in communicating data; and
said recognizing step comprises the step of identifying said time unit.

7. A method of controlling a transceiver having a first synthesizer and a second synthesizer, said method permitting rapid switching between channels, and said method comprising the steps of:

receiving a channel control command from a communication network controller at a transceiver;

programming said first synthesizer to generate a first oscillation signal corresponding to a channel having a frequency which is responsive to said channel control command;

communicating, by said transceiver after said programming step, over a channel which is defined by a second oscillation signal generated by said second synthesizer;

recognizing a switching event, said switching event being an instruction to said transceiver to activate take frequency programmed by said first synthesizer;; and communicating by said transceiver, after said switching event, over said channel which is defined by said first oscillation signal, said channel control command identifies a first frequency corresponding to said first oscillation signal, a first time unit associated with said first frequency, a second frequency, and a second time unit associated with said second frequency;

said recognizing step comprises the step of identifying said first time unit; and said method additionally comprises the step of programming, after said recognizing step, said second synthesizer to generate a third oscillation signal which corresponds to said second frequency.

8. A method as claimed in claim 7 additionally comprising the steps of:
identifying said second time unit; and communicating, after said second time unit, over a channel which is defined by said third oscillation signal.

9. A method of operating a transceiver for communication over a variable bandwidth communication channel, said transceiver having a first synthesizer and a second synthesizer, said method permitting rapid switching between channels, and said method comprising the steps of:

(a) programming said first synthesizer to oscillate at a first frequency;

(b) transmitting to a communication network controller by said transceiver a first communication at said first frequency;

(c) receiving from said communication network controller at said transceiver a channel control command which specifies a second frequency, said channel control command identifying a time unit available for use in transmitting data at said second frequency;

(d) programming said second synthesizer to oscillate at said second frequency in response to laid channel control command;

(e) transmitting by said transceiver a second communication at said second frequency; and (f) recognizing a switching event so that said step (e) is performed in response to said switching event, said switching event being an instruction to said transceiver to activate said second frequency during the occurrence of said identified time unit.

10. A method of operating a transceiver having a first synthesizer and a second synthesizer, said method permitting rapid switching between channels, and said method comprising the steps of:

(a) programming said first synthesizer to oscillate at a first frequency;

(b) transmitting to a communication network controller by said transceiver a first communication at said first frequency;

(c) receiving from said communication network controller at said transceiver a channel control command which specifies a second frequency;

(d) programming said second synthesizer to oscillate at said second frequency in response to said channel control command; and (e) transmitting by said transceiver a second communication at said second frequency, said channel control command identifies a plurality of frequencies including said second frequency; and said step (d) programs a plurality of synthesizers, including said second synthesizer, to oscillate at a corresponding plurality of frequencies, including said second frequency.

11. A method as claimed in claim 10 additionally comprising the step of selecting said second frequency from said plurality of frequencies.

12. A method as claimed in claim 11 wherein said selecting step comprises the step of receiving a second channel control command which identifies said second frequency.

13. A transceiver which is quickly switchable between channels, said transceiver comprising:
a first synthesizer having a control input and an oscillator output;
a second synthesizer having a control input and an oscillator output;
a transmitter having an oscillator input;

a switch having first and second input ports coupled to said first and second synthesizer oscillator outputs, respectively, having an output port coupled to said oscillator input of said transmitter, and having a control input;

a receiver having a baseband output for outputting data; and a controller having an input coupled to said receiver baseband output and having at least one data output coupled to said first and second synthesizer and switch control inputs, said controller is further configured to monitor said data received from said receiver baseband output and to program said second synthesizer in response to said received data.

14. A transceiver as claimed in claim 13 wherein said controller is further configured to recognize a switching event and to control said switch so that said second synthesizer drives said transmitter when said switching event occurs, said switching event being an instruction to said transceiver to activate a new frequency.

15. A transceiver as claimed in claim 14 wherein
said controller is further configured to identify an activation channel control command obtained from said receiver baseband output as said switching event.

16. A transceiver as claimed in claim 14 wherein:
said received data additionally specifies a time unit available for use in transmitting from said transmitter; and
said controller is further configured to identify said specified time unit as said switching event.

17. A transceiver as claimed in claim 13 wherein said controller is configured so that said first synthesizer drives said transmitter immediately after said controller programs said second synthesizer to generate a new frequency at said second synthesizer oscillator output.

18. A method for communicating using up to L different frequency channels during some of T time units where L and T are less than 5000, comprising the steps of:
providing M frequency synthesizers for controlling up to L carrier frequencies for the L different channels, where $M<L$ and M is a positive integer;
providing up to $M-1$ of L assignments for up to $M-1$ of the frequency synthesizers, each of said assignments being associated with a predicted carrier frequency and being directed toward future time units;
pre-setting up to $M-1$ of M frequency synthesizers to provide the $M-1$ of L predicted carrier frequencies;
receiving a channel control command that identifies said predicted carrier frequency and identifies a first time segment; and
thereafter activating at least one of the L different frequency channels using one of said M frequency synthesizers pre-set in said presetting step during said first time segment, wherein said at least one of said L different frequency channels corresponds to said predicted carrier frequency, and wherein the activating step is performed in response to receipt of said channel control command.

19. A method as claimed in claim 18 further comprising activating another of the L different frequency channels using another of said M frequency synthesizers pre-set in said pre-setting step during a second time segment.

20. A transceiver for switching between any of L different frequency communication channels L being less than 5000, in a first time period, comprising:
M frequency synthesizer means for generating any of the L different frequencies, said frequency synthesizer means having frequency setting time periods, wherein said frequency setting time periods are greater than said first time period, and where $M<L$ and M is a positive integer;
means, coupled to the synthesizer means, for pre-setting up to $M-1$ of the frequency synthesizer means for up to $M-1$ anticipated communication channel frequencies prior to their use for communication;
means, coupled to said means for pre-setting for receiving a channel control command that identifies a first time segment and identifies one of said anticipated communication channel frequencies that is to be activated during said first time segment, said frequency being one of said L different frequencies; and
switching means, coupled to the synthesizer means, for activating one of the preset frequency synthesizer means during said first time segment for use in a predetermined communications channel, said one of the preset frequency synthesizer means generating said anticipated communication channel frequency identified by said channel control command.

21. A transceiver as claimed in claim 20, further comprising, monitoring means, coupled to the presetting and switching means, for determining which communication channels are likely to be required to operate in which frequencies and for instructing the pre-setting means on the frequencies to which the synthesizers should be preset.

22. A transceiver for switching between any of L different frequency communication channels L being less than 5000, in a first time period, comprising:
M frequency synthesizer means for generating any of the L different frequencies, said frequency synthesizer means having frequency setting time periods, wherein said frequency setting time periods are greater than said first time period, and where $M<L$ and M is a positive integer;
means, coupled to the synthesizer means, for pre-setting up to $M-1$ of the frequency synthesizer means for up to $M-1$ anticipated communication channel frequencies prior to their use for communication;
switching means, coupled to the synthesizer means, for activating one of the preset frequency synthesizer means for use in a predetermined communications channel;
monitoring means, coupled to the pre-setting and switching means, for determining which communication channels are likely to be required to operate in which frequencies and for instructing the presetting means on the frequencies to which the synthesizers should be preset; and
memory means, coupled to said monitoring means, synthesizer means, presetting means, and switching means, for storing instructions for presetting and activating the synthesizer means.

* * * * *

UNITED STATES PATENT AND TRADEMARK OFFICE
CERTIFICATE OF CORRECTION

PATENT NO.  : 5,452,290
DATED       : September 19, 1995
INVENTOR(S) : Thomas James Mihm, Jr.

It is certified that error appears in the above-indentified patent and that said Letters Patent is hereby corrected as shown below:

In Claim 7, column 15, line 50, replace "take" with --the--.

In Claim 9, column 16, line 22, replace "laid" with --said--.

In Claim 21, column 18, line 33, replace "presetting" with --pre-setting--.

In Claim 22, column 18, line 59, replace "presetting" with --pre-setting--.

Signed and Sealed this

Ninth Day of January, 1996

Attest:

BRUCE LEHMAN

*Attesting Officer*    *Commissioner of Patents and Trademarks*